US012128822B1

(12) United States Patent
Van Wiemeersch et al.

(10) Patent No.: US 12,128,822 B1
(45) Date of Patent: Oct. 29, 2024

(54) VEHICLE HAVING SELECTABLE LIGHTING ENVIRONMENT AND METHOD

(71) Applicant: Ford Global Technologies, LLC, Dearborn, MI (US)

(72) Inventors: John Robert Van Wiemeersch, Novi, MI (US); Stuart C. Salter, White Lake, MI (US); Mark Larry, Macomb, MI (US); Scott Alan Watkins, Canton, MI (US); Brendan Diamond, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/322,968

(22) Filed: May 24, 2023

(51) Int. Cl.
*B60Q 3/85* (2017.01)
*B60Q 3/74* (2017.01)
*H05B 47/155* (2020.01)
*H05B 47/165* (2020.01)

(52) U.S. Cl.
CPC ............. *B60Q 3/85* (2017.02); *B60Q 3/74* (2017.02); *H05B 47/155* (2020.01); *H05B 47/165* (2020.01); *B60Q 2900/50* (2022.05)

(58) Field of Classification Search
CPC .......... B60Q 3/74; B60Q 3/75; H05B 47/155; H05B 47/165
See application file for complete search history.

(56) References Cited

U.S. PATENT DOCUMENTS

| 2008/0191626 A1 | 8/2008 | Salter et al. |
| 2019/0135170 A1* | 5/2019 | Salter ................. B60Q 3/20 |
| 2021/0261050 A1* | 8/2021 | Sobhany ............. B60Q 3/80 |
| 2021/0276483 A1* | 9/2021 | Kang .................. B60Q 3/217 |

FOREIGN PATENT DOCUMENTS

| DE | 102013009063 A1 | 12/2014 |
| GB | 2525655 A | 11/2015 |
| JP | 2010269736 A | 12/2010 |

* cited by examiner

*Primary Examiner* — Evan P Dzierzynski
*Assistant Examiner* — Nathaniel J Lee
(74) *Attorney, Agent, or Firm* — Frank Lollo; Price Heneveld LLP

(57) ABSTRACT

A vehicle having controllable light illumination includes a cabin interior, a plurality of light illumination devices located in the cabin interior, a user input configured to receive a user selectable lighting theme, and a controller configured to control the plurality of light illumination devices to simulate an environmental lighting condition based on the user selectable lighting theme. The controller controls color and brightness of the plurality of light illumination devices to simulate the environmental lighting condition.

20 Claims, 10 Drawing Sheets

VEHICLE HAVING SELECTABLE LIGHTING ENVIRONMENT AND METHOD

FIELD OF THE DISCLOSURE

The present disclosure generally relates to vehicle cabin lighting, and more particularly relates to controlled light illumination to achieve a desired lighting ambiance within the vehicle.

BACKGROUND OF THE DISCLOSURE

Motor vehicles are commonly equipped with various lighting systems which provide light illumination within the cabin interior. In addition, vehicles are also commonly equipped with one or more illuminated display systems. It would be desirable to provide for controlled light illumination within the vehicle cabin interior to achieve a desired lighting environment.

SUMMARY OF THE DISCLOSURE

According to a first aspect of the present disclosure, a vehicle having controllable light illumination is provided. The vehicle includes a cabin interior, a plurality of light illumination devices located in the cabin interior, and a user input configured to receive a user selectable lighting theme. The vehicle also includes a controller configured to control the plurality of light illumination devices to simulate an environmental lighting condition based on the user selectable lighting theme, wherein the controller controls color and brightness of the plurality of light illumination devices to simulate the environmental lighting condition.

Embodiments of the first aspect of the present disclosure can include any one or a combination of the following features:
- the environmental lighting condition comprises one of a daytime environment, a nighttime environment, a dusk environment, and a dawn environment;
- the environmental lighting condition comprises at least one of a nightclub environment, a home environment, an office environment, and a social media environment;
- the plurality of light illumination devices comprises a plurality of electronic displays;
- the plurality of electronic displays comprises at least one of a panoramic display, a head-up display, a dashboard mounted display and a center mounted display;
- the plurality of electronic displays provides ambient lighting;
- the plurality of light illumination devices comprises a plurality of lighting devices;
- the plurality of lighting devices comprises at least one of an overhead console light device and an ambient lighting device;
- the user input is provided on a touchscreen display;
- memory storing a plurality of user selectable lighting themes, wherein the user selectable lighting theme is selectable by the touchscreen display; and the plurality of light illumination devices each generate a light illumination having a selectable light color and brightness.

According to a second aspect of the present disclosure, a method of controlling light illumination in a vehicle is provided. The method includes the steps of controlling illumination of a plurality of lighting devices located in the cabin interior of the vehicle, controlling illumination of lighting from a plurality of electronic displays located in the cabin interior, and selecting via a user input a lighting theme that simulates an environmental lighting condition for the cabin interior. The method further includes the step of controlling light color and brightness of the plurality of lighting devices and the plurality of electronic displays to simulate the environmental lighting condition in the cabin interior based on the selected lighting theme.

Embodiments of the second aspect of the present disclosure can include any one or a combination of the following features:
- the environmental lighting condition comprises one of a daytime environment, a nighttime environment, a dusk environment, and a dawn environment;
- the environmental lighting condition comprises at least one of a nightclub environment, a home environment, an office environment, and a social media environment;
- the plurality of electronic displays comprises at least one of a panoramic display, a head-up display, a dashboard mounted display and a center display;
- the plurality of electronic displays provides ambient lighting;
- the plurality of lighting devices comprises at least one of an overhead console light device and an ambient lighting device;
- the step of selecting a user input comprises selecting the user input on a touchscreen display;
- storing a plurality of selectable lighting themes in memory, wherein the selected lighting theme is selected from the plurality of stored selectable lighting themes; and
- the plurality of electronic displays and the plurality of lighting devices each generate a light illumination having a selectable light color and brightness.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
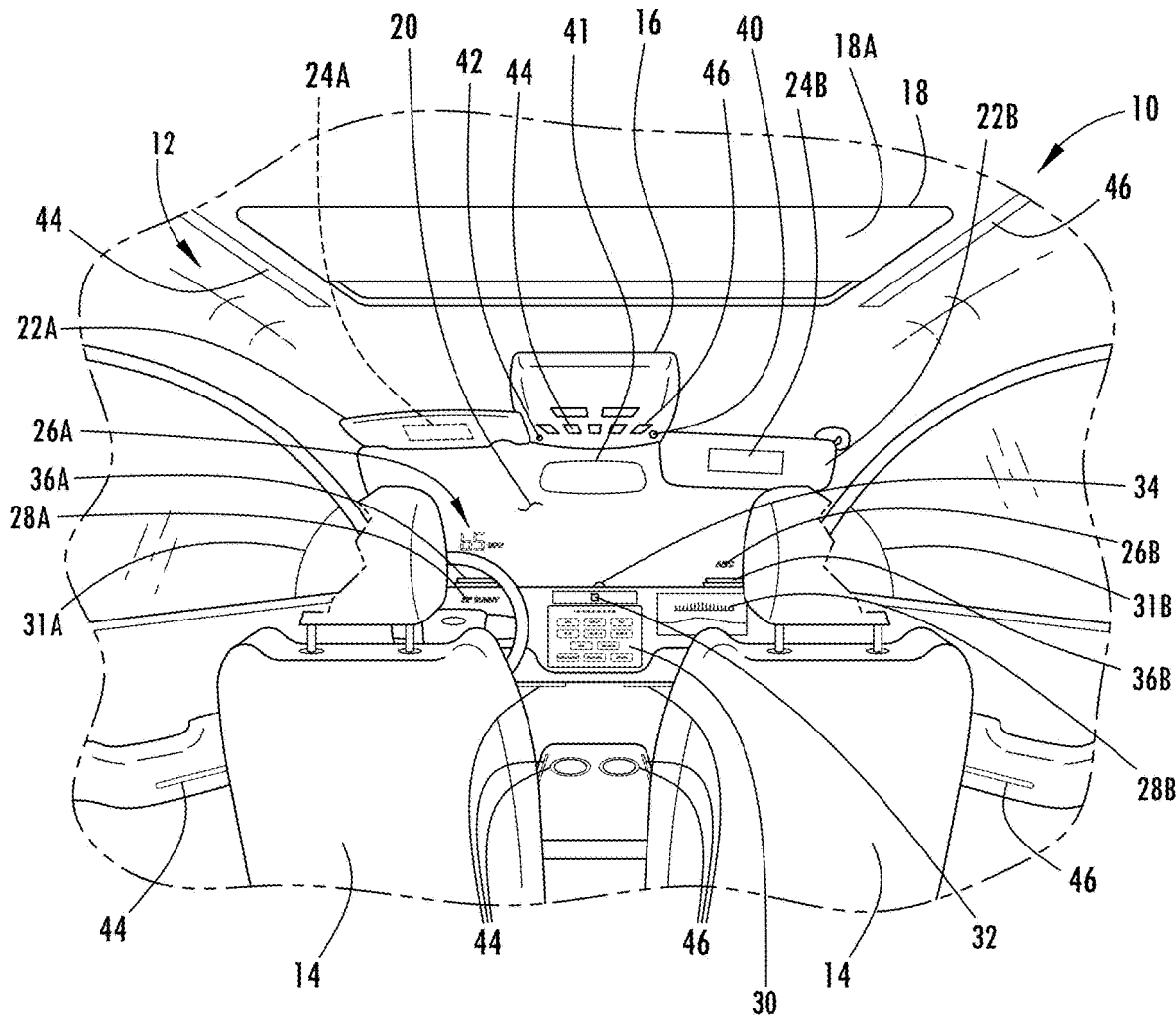
FIG. 1 is a rear perspective view of the cabin interior of a motor vehicle equipped with various light illumination devices, according to one example.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having controlled light illumination and a method of controlling light illumination in the vehicle to simulate a lighting theme. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
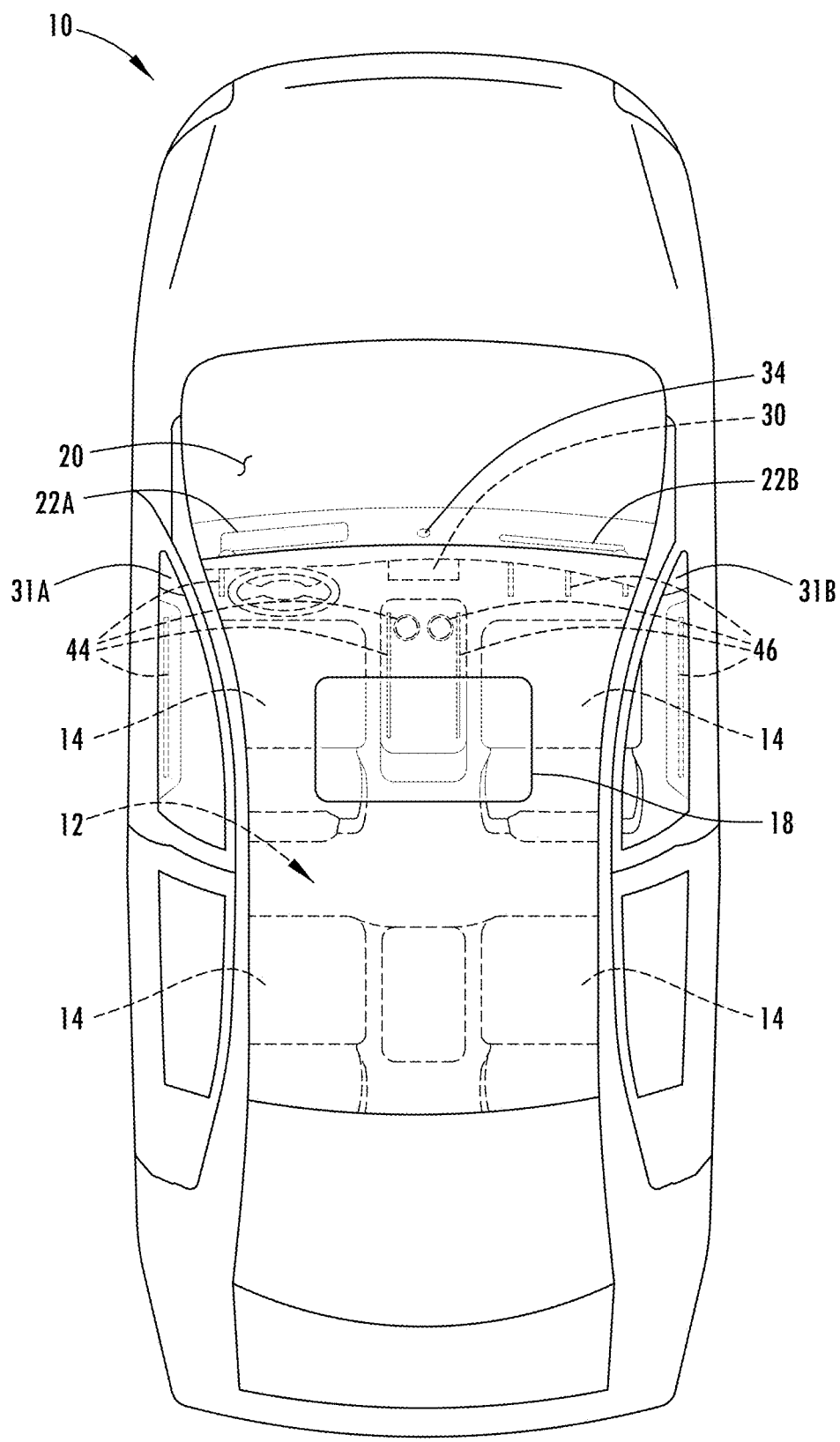
FIG. 2 is a top view of the motor vehicle shown in FIG. 1 further illustrating the various light illumination devices.

Referring to FIGS. 1 and 2, a wheeled automotive or motor vehicle 10 is generally illustrated configured with passenger seating and other accommodations for transporting one or more passengers. The motor vehicle 10 has a cabin interior 12 generally defined by a vehicle body. The cabin interior 12 may contain various features and trim components and light illumination devices. The cabin interior 12 is shown having an arrangement of passenger seats 14 which may include a first front row of seating and a second rear row of seating in the example shown. Each row of seating may have one or more seats. The vehicle 10 may include additional rows of seating such as is common for large SUV, van, truck or bus. It should be appreciated that the vehicle 10 may be a motor vehicle, such as a wheeled car, truck, SUV, van or bus, for example, or an airplane, train, boat or other vehicle capable of transporting one or more passengers.

The cabin interior 12 in the example shown in FIGS. 1 and 2 has a plurality of light illumination devices that include a plurality of electronic displays located in the cabin interior 12 and a plurality of lighting devices located in the cabin interior 12. Each of the plurality of illumination devices provides light illumination that may be varied in color and brightness to adjust the overall lighting theme to simulate a selected environment within the cabin interior 12. For example, the lighted environment in the cabin interior 12 may be adjusted to provide a lighting theme consistent with lighting experienced during dawn, sunny days, at dusk, in an office, during an overcast day, or other lighting themes.

The plurality of electronic displays located in the cabin interior 12 may include any of a number of plurality of electronic display devices that emit light illumination including a center mounted touchscreen display 30 shown positioned in a dashboard forward of the front row of seating generally centered between the passenger and driver seats. The center mounted touchscreen display 30 is embodied as a human machine interface (HMI) configured to receive user touch inputs and to generate display outputs. The electronic display also include a driver side panoramic display 28A shown located directly forward of the driver seat and the steering wheel on the driver side of the vehicle 10, and a passenger side panoramic display 28B shown located directly forward of the front passenger seat on the passenger side of the vehicle 10. The driver and passenger side panoramic displays 28A and 28B may extend a partial distance along the front of the instrument panel or may extend further and/or abut each other or may be integrated into a single panoramic display extending across the dashboard, according to various examples. The plurality of electronic displays may also include a driver side camera display 31A and a passenger side camera display 31B that display exterior rear side camera generated images and replaces the need for exterior side rearview mirrors. In the example shown in FIG. 1, a driver side visor 22A has a vanity mirror 24A and the passenger side visor 22B has a vanity mirror 24B. In this example, the vanity mirrors 24A and 24B can be illuminated by controlling the light emitted by the plurality of illumination devices, thereby not requiring the need for lighting devices in the visors. However, the plurality of electronic displays may further include a driver visor mounted display in place of mirror 24A on or near a driver side visor 22A that may operate with a camera that captures images and displays the captured images on the driver visor display 24A to simulate a vanity mirror. Similarly, the plurality of electronic displays may include a passenger side visor mounted display in place of mirror 24B mounted on or near the passenger side visor 22B forward of the passenger seat which may also operate with a camera to capture images and display the captured images to simulate a vanity mirror. The plurality of electronic displays may further include a driver side head-up display (HUD) 26A and a passenger side HUD 26B, both of which project images onto the windshield forward of the driver and front passenger. Further, the plurality of electric displays includes a light illuminable moonroof 18 in the overhead roof that may illuminate in a desired color and brightness. The moonroof 18 may include a moveable shade 18A that may be moved to cover or expose the moonroof 18 to thereby control the amount of light entering the vehicle cabin through the moonroof 18. These and other electronic displays may be provided throughout the cabin interior 12 of the vehicle 10, each of which provides for light illumination having a lighting color and a brightness that may be adjusted to achieve an overall lighting theme in the cabin interior. For example, the brightness of each of the electronic displays may change color from a first color to a selected second color and the brightness may also be changed to change the overall light intensity and color blending to achieve a desired lighting theme.

The plurality of electronic displays may be provided in different configurations, sizes, shapes and in different locations within the cabin interior 12 of the vehicle 10. The plurality of electronic devices are activated to provide light illumination with one or more lighted images presented on a display screen. The light illumination displayed on the display screen includes a lighting color and a brightness, both of which may be adjusted to display different colors and levels of brightness. Exemplary examples of the types of electronic displays may include projection and reflection based heads-up displays (HUD), light-emitting diode (LED) displays, organic light-emitting diode (OLED) displays, liquid crystal displays (LCD) and other available color illuminated display devices.

The plurality of lighting devices may include any of a number of ambient lighting devices located throughout the cabin interior 12 of the vehicle 10, such as ambient lighting that may be present in the floor well of the vehicle 10, proximate to cupholders and storage compartments, located in or near trim panels and elsewhere in the cabin interior 12. In addition, the plurality of lighting devices may include lights that are provided in an overhead center console 16 or the roof or doors such as may include ambient lighting, reading lights, map lights, and other lights which are controllable to provide changes in lighting color and brightness.

The plurality of lighting devices may be configured in different configurations and at various locations within the cabin interior 12 of the vehicle 10. The plurality of lighting devices may include LEDs and associated optics for providing light illumination. The LEDs may be configured as red-green-blue (RGB) LEDs that are controllable to produce different colors of lighting. Some of the plurality of lighting devices may include light pipes or light guides which may transmit and illuminate light along the length of the light guide and/or at the ends, for example. Each of the plurality of lighting devices provides a light illumination having a color and a brightness, both of which may be controlled and adjusted to achieve a selected color and brightness.

Figure 3:
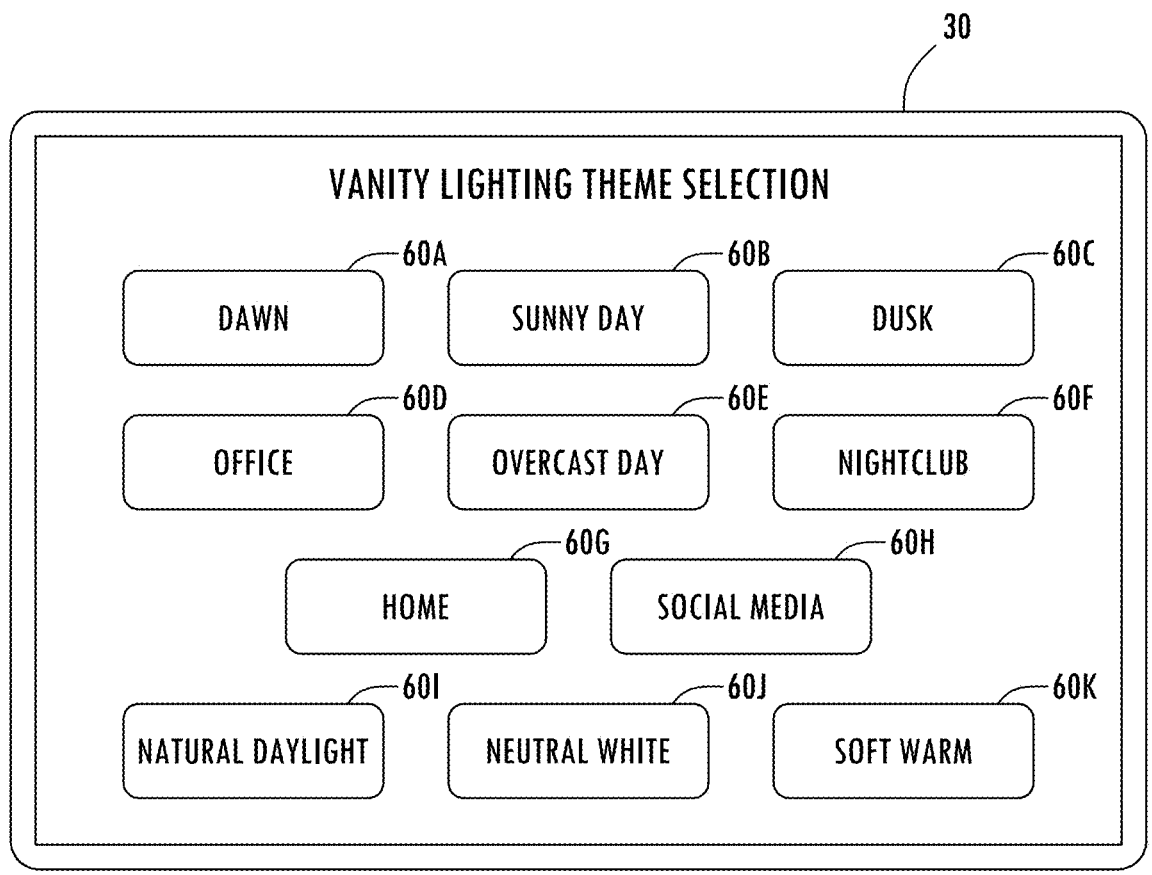
FIG. 3 is a front view of an HMI touchscreen display on a center console in the vehicle cabin displaying user selectable colored lighting theme inputs according to one example.

The center mounted touchscreen 30 is shown in one example in FIGS. 1 and 3 having a display in the form of a touchscreen that provides for user inputs and outputs. The center touchscreen 30 may include a resistive or capacitive touchscreen that senses a user input, such as a finger of a user to initiate an input selection of one of input theme 60A-60K. Shown displayed in FIG. 3 are various user input selections that are selectable by a user to select one of a plurality of illustrated lighting themes which are used to adjust the lighting color and brightness of the plurality of illumination devices to achieve the desired lighting theme in the cabin interior 12. In the example shown, the user selectable lighting themes may include a dawn lighting theme 60A which simulates the early outdoor light illumination present just before sunrise. In addition, the lighting themes may include a sunny day lighting theme 60B which simulates a bright sunny day outdoor lighting environment. Lighting themes may further include a dusk lighting theme 60C which simulates the outside sunset lighting environment at dusk just after the sun has set. Other lighting themes include an office lighting theme 60D which simulates indoor lighting experienced in an office environment. Further, the lighting themes may include an overcast day lighting theme 60E which simulates outdoor lighting on a cloudy day in the outside environment. Further lighting themes may include a nightclub lighting theme 60F which simulate the lighting experience indoors in a nightclub. Further lighting themes include a home lighting theme 60G which may simulate the home indoor lighting environment. Further lighting themes may include a social media lighting theme 60H which simulates a social media lighting environment for broadcast. The lighting themes may further include a natural daylight lighting theme 60I, a neutral white lighting theme 60J and a soft/warm lighting theme 60K, according to further examples. As such, a user may enter a selectable lighting theme by inputting the selection on the center touchscreen 30, according to one example. It should be appreciated that the selectable lighting theme may otherwise be selected using other inputs such as audible instructions spoken and detected by a microphone or input via other HMI input devices onboard the vehicle or brought into the vehicle (e.g., a smartphone or tablet). It should further be appreciated that lighting themes may be predicted and selected based on a history of use or preferences for a user such as the driver or one or more passengers in the vehicle.

Figure 4:
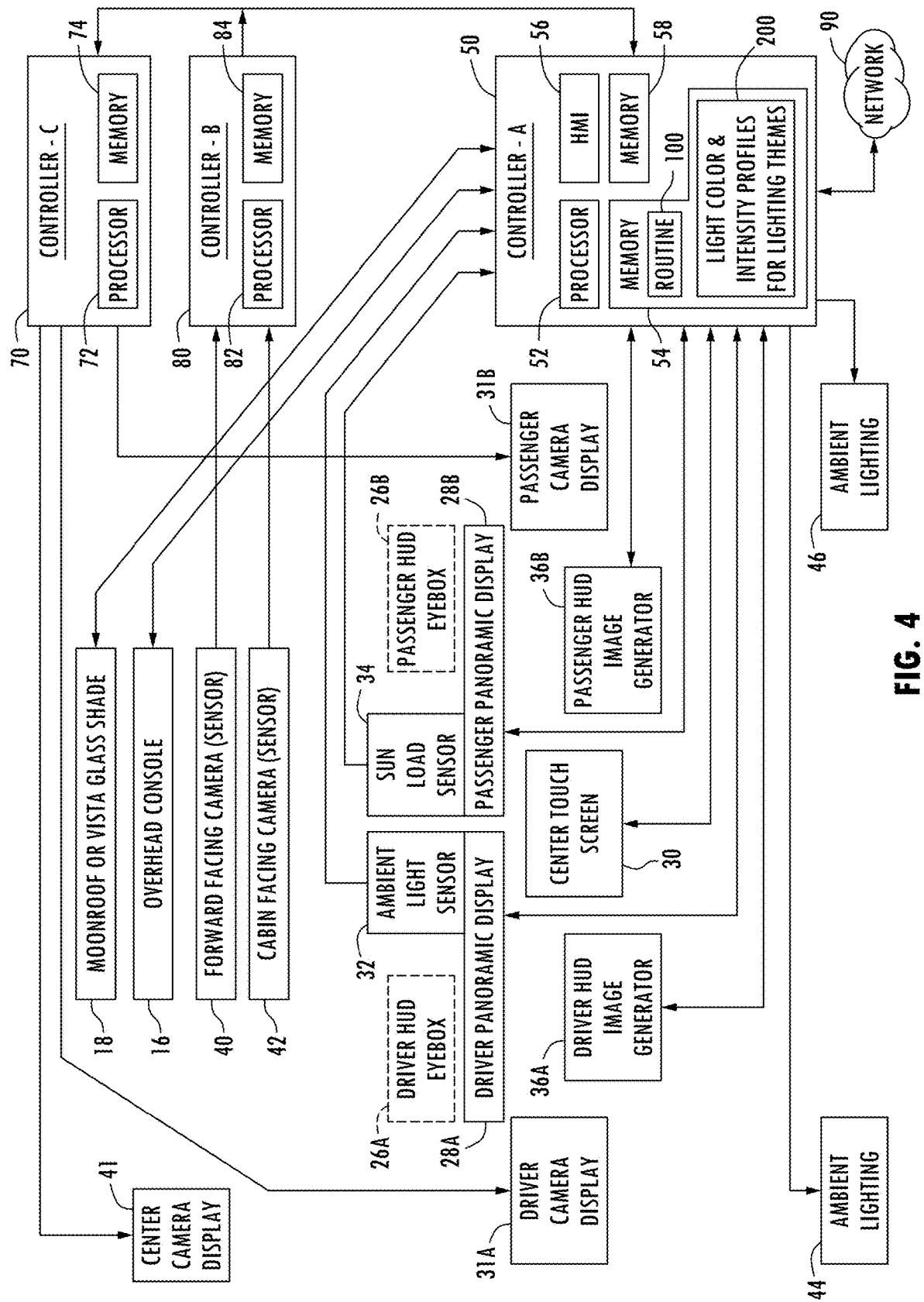
FIG. 4 is a block diagram illustrating a control system for controlling the various light illumination devices, according to one embodiment.
Figure 5A:
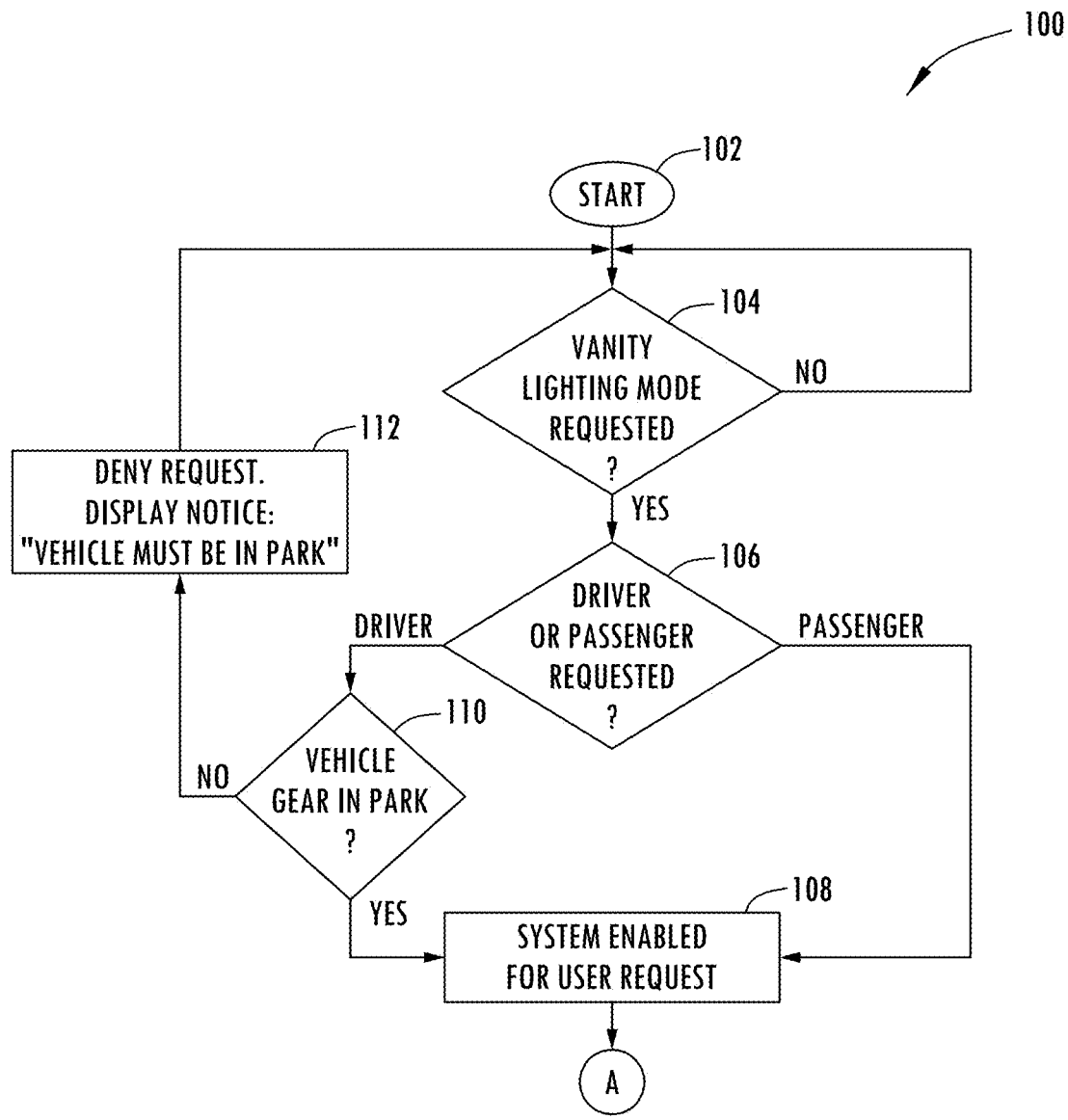
FIGS. 5A-5F is a flow diagram illustrating a routine for controlling the various light illumination devices according to a selected lighting theme.
Figure 5B:
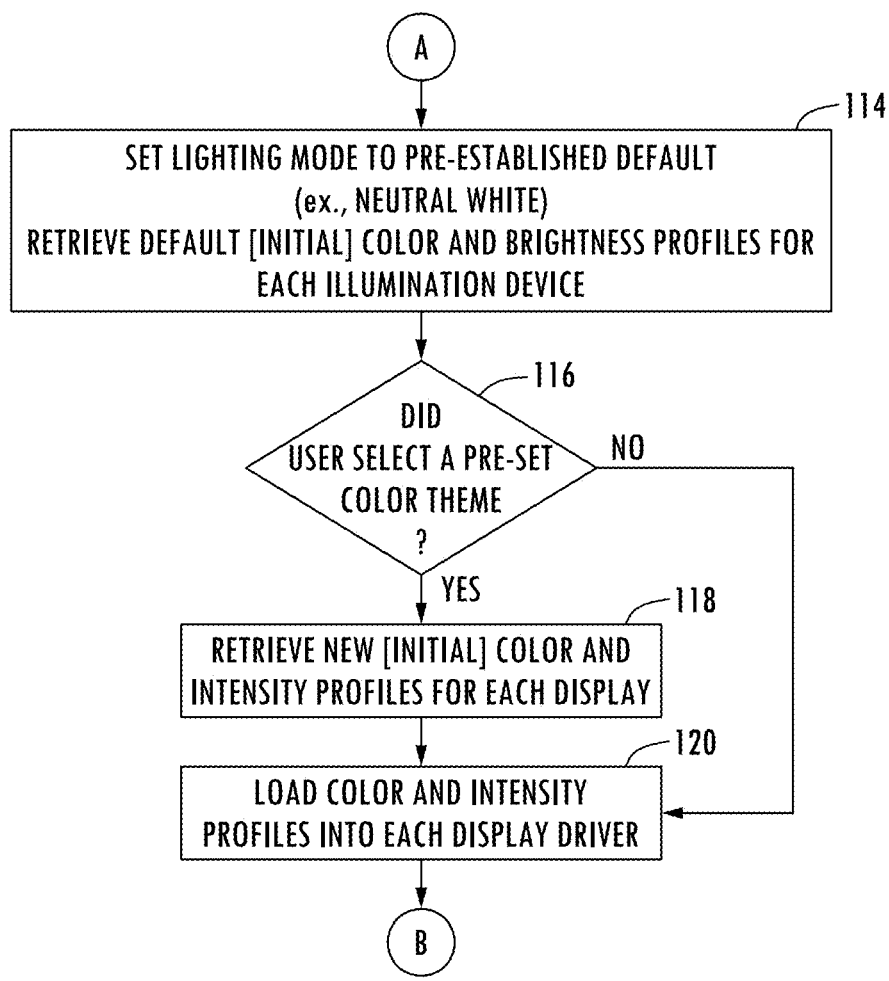
Figure 5C:
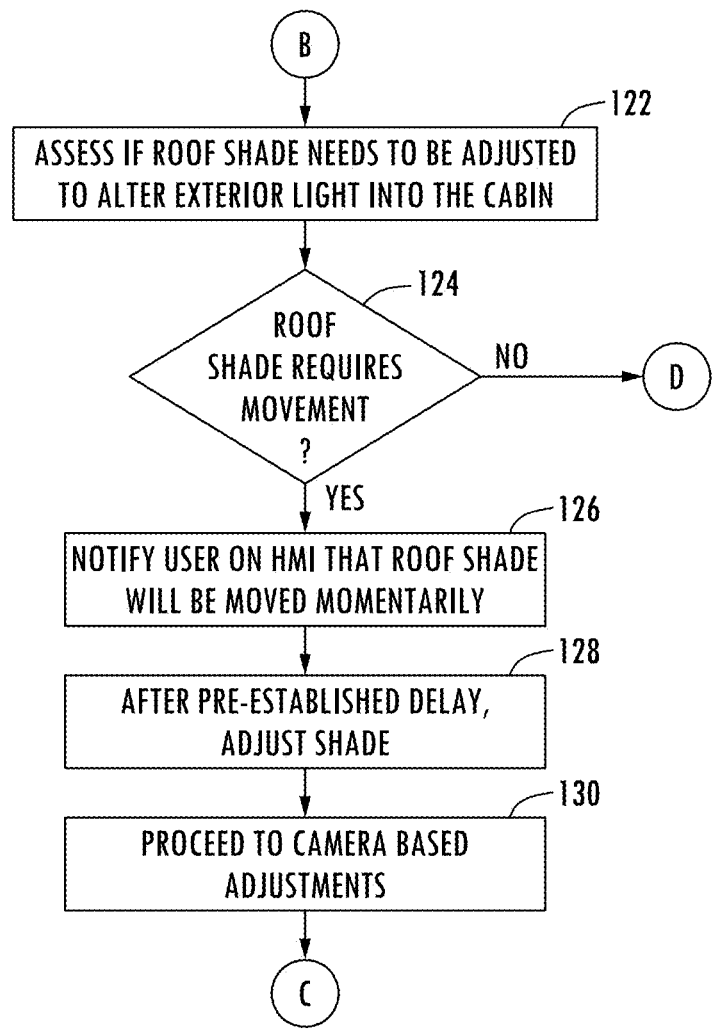
Figure 5D:
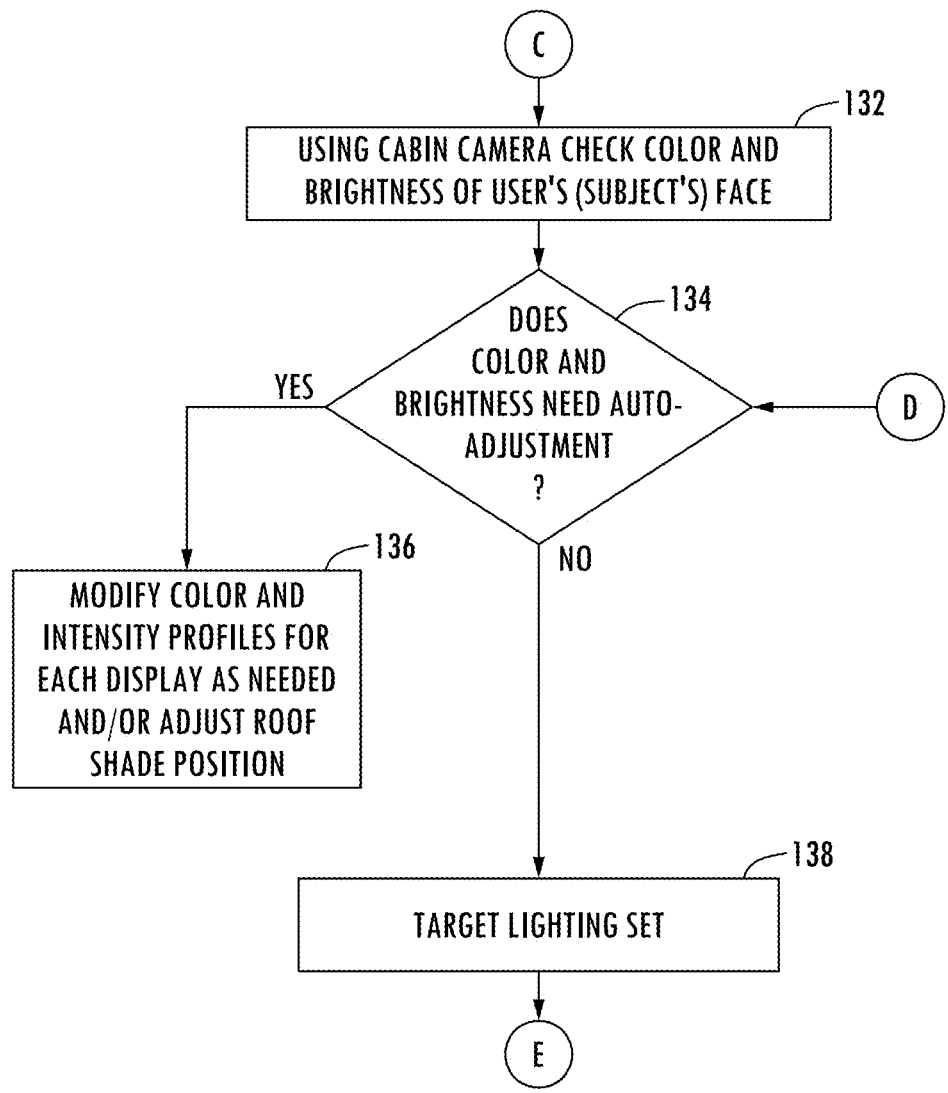
Figure 5E:
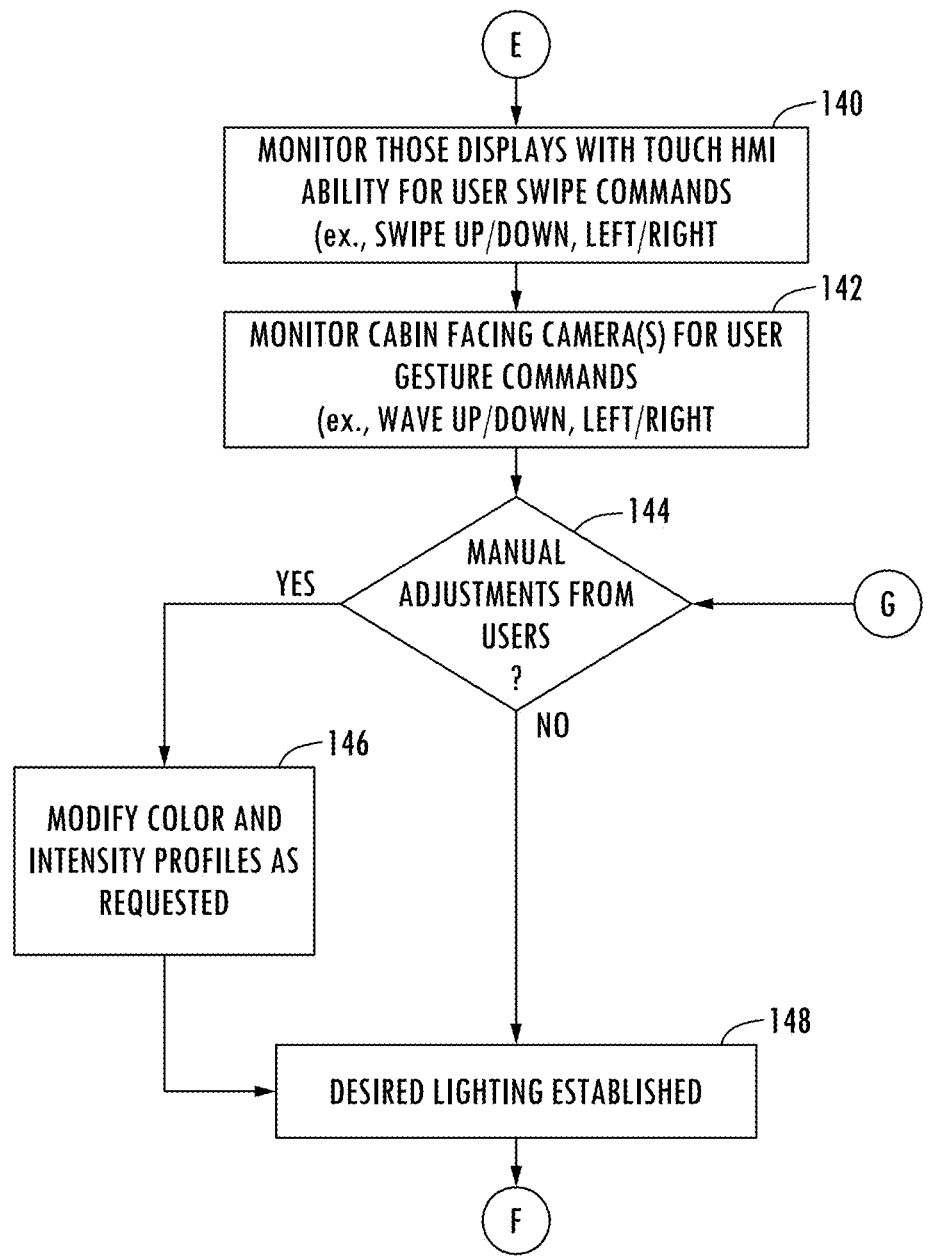
Figure 5F:
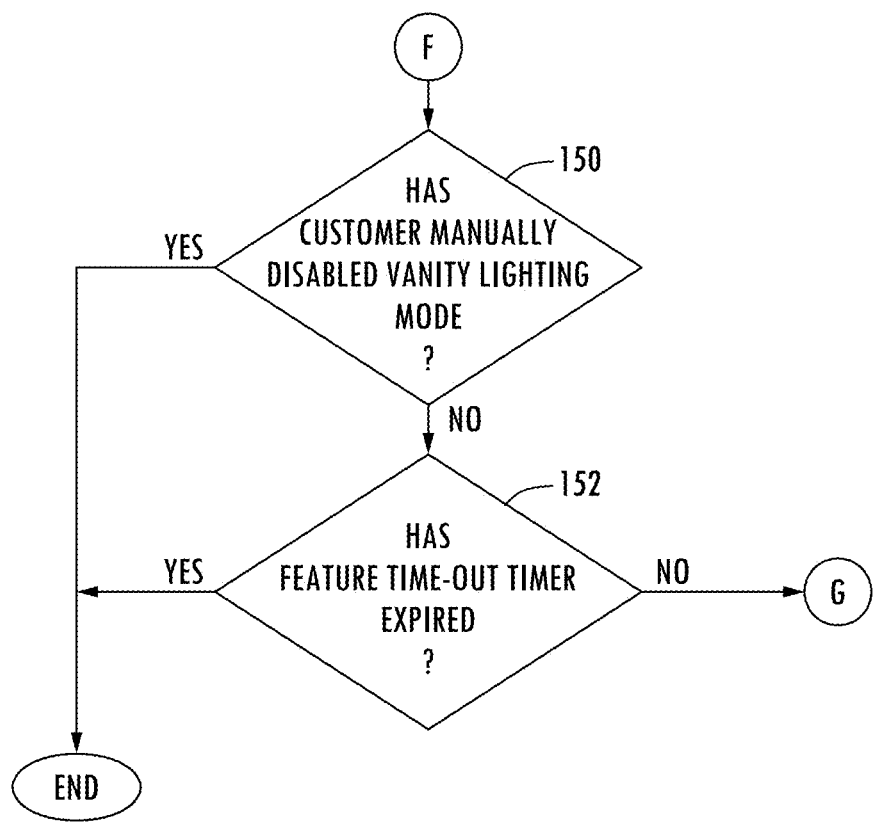

The vehicle 10 is further equipped with one or more controllers, such as the controller system shown in one example in FIG. 4 which processes various inputs and controls the plurality of illumination devices to achieve a desired overall light illumination theme in the cabin interior 12. In the example shown, the vehicle 10 includes a first controller 50 labeled controller-A which is configured to control the various illumination devices and communicates with a second controller 80 labelled controller-B which processes camera images and provides image processing and a third controller 70 labelled controller-C which provides camera image processing for the driver and passenger camera displays 31A and 31B and the center camera display 41. It should be appreciated that the controller system may include one or more shared or dedicated controllers for processing various inputs and performing the functionalities described herein. The first controller 50 includes control circuitry shown as a processor 52, such as a microprocessor, and memory 54. Stored within memory 54 and executed by processor 52 is a routine 100. The first controller 50 further includes light color and intensity profiles for the selectable lighting theme which are stored in memory 54. In this example, the first controller 50 also includes an HMI process circuitry 56 which displays and processes touchscreen input and has associated memory 58. Each of the second and third controllers 80 and 70 may include control circuitry such as a processor 82 or 72 and memory 84 or 74, respectively. It should be appreciated that other control circuitry employing analog and/or digital circuitry may be used to provide the controller system, according to other examples.

The first controller 50 receives various inputs including sensed outputs from one or more ambient light sensors 32 indicative of the ambient lighting conditions within and outside of the vehicle and a sun load sensor 34 indicative of the sunlight illumination reaching the vehicle from the sun. In addition, the first controller 50 communicates with each of the illumination devices including the driver camera display 31A, driver HUD eye box 26A, driver panoramic display 28A, center touchscreen 30, passenger panoramic display 28B, passenger HUD eye box 26B, passenger camera display 31B and the center camera display 41. In addition, the first controller 50 communicates with the various lighting devices including colored ambient lighting device 44 and colored ambient lighting device 46. The driver HUD image generator 36A generates the images for the driver HUD eye box 26A, whereas the passenger HUD images generator 36B generates the images for the passenger HUD eye box 26B. Further, first controller 50 further communicates with the overhead console 16 to control illumination devices in the overhead console such as lighting devices associated therewith and communicates with the moonroof or vista glass shade 18 to control lighting illumination provided by the moonroof or vista glass as a function of the position of shade 18.

The second controller 80 processes the camera sensor images generated with both the forward facing camera sensor 40 and the cabin facing camera sensor 42. This is achieved by performing camera image processing via processor 82 on the captured images and determining the captured lighting both exterior to the vehicle and in the environment within the cabin interior.

The third controller 70 is shown as a dedicated camera display controller for processing images associated with the cameras located within each of the driver and passenger camera displays 31A and 31B and the center camera display 41. In addition, the third controller 70 may be used to process the captured images to determine the lighting environment from the images captured with the cameras. It should be appreciated that the functionality described in connection with the second controller 80 and third controller 70 may be integrated within the first controller 50, according to another example.

Further, the first controller 50 may communicate with a network 90 to send and receive data. For example, the network 90 may provide adding lighting themes that may be downloaded and stored within memory 54 and used to present a new lighting theme, for example. Each download lighting theme may include light color and intensity profiles. Conversely, users may utilize network 90 to upload a custom lighting theme they developed to share with other users of the system in other vehicles with the lighting system. The communication between controller 50 and network 90 may be wireless, for example.

Referring to FIGS. 5A-5F, the routine 100 for controlling the plurality of illumination devices to achieve a selected lighting theme is illustrated, according to one embodiment. Routine 100 begins at step 102 and proceeds to decision step 104 to determine if a vanity lighting mode has been requested and, if not, waits for a vanity mode request. If a vanity lighting mode has been requested, routine 100 proceeds to decision step 106 to determine if the request is from a driver or passenger. If the request is from a passenger, routine 100 proceeds to step 108 to enable the lighting system for requested user. Otherwise, if routine 100 determined the driver has requested the lighting mode, routine 100 proceeds to decision step 110 to determine if the vehicle gear is in park or stopped and, if so, proceeds to step 108 for the lighting system to enable for the requested user. If the vehicle is not in park or stopped, the routine 100 proceeds to step 112 to deny the request and provide a notice that the vehicle must be in park, before returning to step 104.

Once the lighting system is enabled for the requested user, routine 100 proceeds to step 114 to set the lighting mode to the pre-established default settings, such as a neutral white light, for example, and retrieves the default initial brightness and color profiles for each illumination device. Next, at decision step 116, routine 100 determines whether the user selected a preset color scheme and, if so, retrieves the new initial color and intensity profiles for each illumination device before proceeding to step 120 to load the color and intensity profiles into each light/display driver. If the user did not select a preset color scheme, routine 100 proceeds directly to step 120 to load the color and intensity profiles into each light/display driver.

Once the color and intensity profiles for each display driver are loaded, routine 100 proceeds to step 122 to assess if the moonroof shade needs to be adjusted to alter the exterior light into the cabin. At decision step 124, routine 100 determines if the moonroof shade requires movement and, if so, proceeds to step 126 to notify the user via the HMI that the roof shade will be moved momentarily. Thereafter, routine 100 proceeds to step 128 for a pre-established delay after which the system adjusts the moonroof shade, and then to step 130 to proceed to the camera-based adjustments. Thereafter, routine 100 proceeds to step 132 to check color and brightness of the user's face using the cabin camera, and then to decision step 134 to determine if the color and brightness need auto-adjustment. Returning to decision step 124, if the roof shade requires movement, routine 100 proceeds directly to decision step 134. If the lighting color and brightness need auto-adjustment, routine 100 proceeds to step 136 to modify the lighting color and intensity profiles for each illumination device, as needed, and/or adjust the roof shade position. If the lighting color and brightness do not need auto-adjustment, routine 100 proceeds to step 138 to set the target lighting.

Following step 138, routine 100 proceeds to step 140 to monitor those illumination devices which have touch HMI ability for user swipe commands, for example, swipe down, up, left, right. Next, at step 142, routine 100 monitors the cabin facing cameras for user gesture commands, such as waving up, down, left or right. Routine 100 then proceeds to decision step 144 to determine if there were manual adjustments from the user and, if so, modifies the lighting color and intensity profiles as requested in step 146. If manual adjustments are not requested from the user, routine 100 proceeds to step 148 to set the desired lighting, and then proceeds to decision step 150 to determine if a user has manually disabled the vanity lighting mode and, if so, ends at step 154. If a user has not manually disabled the vanity lighting mode, routine 100 proceeds to decision step 152 to determine if the feature has timed out with the time expired and, if so, ends at step 154. If not, routine 100 returns to decision step 144.

Accordingly, the vehicle 10 advantageously provides for a plurality of light illumination devices including electronic displays and lighting devices in the cabin interior 12 and a controller that controls the plurality of light illumination devices to simulate an environmental lighting condition as a lighting theme, such as by controlling the light color and brightness of the plurality of light illumination devices to simulate the lighting theme. This advantageously provides for a desirable ambient lighting theme in the vehicle interior cabin.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle having controllable light illumination, the vehicle comprising:
   a cabin interior;
   a shade that is moveable to control an amount of light entering the cabin interior;
   a plurality of light illumination devices located in the cabin interior;
   a user input configured to receive a user selectable lighting theme; and
   a controller configured to control movement of the shade and the plurality of light illumination devices to simulate an environmental lighting condition based on the user selectable lighting theme, wherein the controller controls the movement of the shade and color and brightness of the plurality of light illumination devices to simulate the environmental lighting condition.

2. The vehicle of claim 1, wherein the environmental lighting condition comprises one of a daytime environment, a nighttime environment, and a dusk environment, or a dawn environment.

3. The vehicle of claim 1, wherein the environmental lighting condition comprises at least one of a home environment, and an office environment.

4. The vehicle of claim 1, wherein the plurality of light illumination devices comprises a plurality of electronic displays.

5. The vehicle of claim 4, wherein the plurality of electronic displays comprises at least one of a panoramic display, a head-up display, a dashboard mounted display and a center mounted display.

6. The vehicle of claim 4, wherein the plurality of electronic displays provides ambient lighting.

7. The vehicle of claim 4, wherein the plurality of light illumination devices comprises a plurality of lighting devices.

8. The vehicle of claim 7, wherein the plurality of lighting devices comprises at least one of an overhead console light device and an ambient lighting device.

9. The vehicle of claim 1, wherein the user input is provided on a touchscreen display.

10. The vehicle of claim 9 further comprising memory storing a plurality of user selectable lighting themes, wherein the user selectable lighting theme is selectable by the touchscreen display.

11. The vehicle of claim 1, wherein the plurality of light illumination devices each generate a light illumination having a selectable light color and brightness.

12. A method of controlling light illumination in a vehicle, the method comprising:
    controlling illumination of a plurality of lighting devices located in a cabin interior of the vehicle;
    controlling illumination of lighting from a plurality of electronic displays located in the cabin interior;
    selecting via a user input a lighting theme that simulates an environmental lighting condition for the cabin interior; and
    controlling a shade to control an amount of light entering the cabin interior and light color and brightness of the plurality of lighting devices and the plurality of electronic displays to simulate the environmental lighting condition in the cabin interior based on the selected lighting theme.

13. The method of claim 12, wherein the environmental lighting condition comprises one of a daytime environment, a nighttime environment, and a dusk environment and or a dawn environment.

14. The method of claim 13, wherein the environmental lighting condition comprises at least one of a home environment and an office environment.

15. The method of claim 12, wherein the plurality of electronic displays comprises at least one of a panoramic display, a head-up display, a dashboard mounted display and a center display.

16. The method of claim 15, wherein the plurality of electronic displays provides ambient lighting.

17. The method of claim 12, wherein the plurality of lighting devices comprises at least one of an overhead console light device and an ambient lighting device.

18. The method of claim 12, wherein the step of selecting a user input comprises selecting the user input on a touchscreen display.

19. The method of claim 18 further comprising storing a plurality of selectable lighting themes in memory, wherein the selected lighting theme is selected from the plurality of stored selectable lighting themes.

20. The method of claim 12, wherein the plurality of electronic displays and the plurality of lighting devices each generate a light illumination having a selectable light color and brightness.

* * * * *